(12) United States Patent
Hattori et al.

(10) Patent No.: US 7,106,485 B2
(45) Date of Patent: Sep. 12, 2006

(54) ELECTROPHORETIC DISPLAY DEVICE AND METHOD OF MANUFACTURING SAME

(75) Inventors: Yasuhiro Hattori, Nagoya (JP); Yoshito Toyoda, Nagoya (JP); Yoshiyuki Kondo, Okazaki (JP); Yuji Hori, Hashima (JP); Fumika Miyazaki, Nagoya (JP); Yumiko Mori, Nagoya (JP); Tsuyoshi Ohashi, Hashima (JP); Douglas J. Fletcher, Bartlett, TN (US); Mark A. Darty, Collierville, TN (US)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/023,403

(22) Filed: Dec. 29, 2004

(65) Prior Publication Data

US 2006/0139732 A1   Jun. 29, 2006

(51) Int. Cl.
G02B 26/00   (2006.01)
(52) U.S. Cl. .................. 359/237; 359/295; 359/296
(58) Field of Classification Search ................ 359/295, 359/296, 243, 245, 290, 238; 345/107
See application file for complete search history.

(56) References Cited

U.S. PATENT DOCUMENTS

| | | | |
|---|---|---|---|
| 5,138,134 A * | 8/1992 | Ellison .................. | 392/448 |
| 6,019,284 A | 2/2000 | Freeman et al. | |
| 6,369,793 B1 | 4/2002 | Parker | |
| 6,693,621 B1 | 2/2004 | Hayakawa et al. | |
| 2003/0043450 A1* | 3/2003 | Liang et al. ................. | 359/296 |
| 2003/0151600 A1* | 8/2003 | Takeuchi et al. ............ | 345/204 |
| 2003/0203178 A1* | 10/2003 | Ravenhall et al. ....... | 428/297.4 |
| 2005/0179641 A1* | 8/2005 | Zhou et al. .................. | 345/107 |

FOREIGN PATENT DOCUMENTS

| | | |
|---|---|---|
| JP | A-9-50504 | 2/1997 |
| JP | A-10-91736 | 4/1998 |
| JP | A-10-154215 | 6/1998 |
| JP | A-10-269331 | 10/1998 |
| JP | A-2003-216111 | 7/2003 |
| JP | A 2003-271911 | 9/2003 |
| JP | A-2003-308025 | 10/2003 |
| JP | A-2004-12814 | 1/2004 |

* cited by examiner

Primary Examiner—Timothy Thompson
Assistant Examiner—Jerry Fang
(74) Attorney, Agent, or Firm—Oliff & Berridge, PLC

(57) ABSTRACT

An electrophoretic display device uses a liquid-phase electrophoretic material not confined in a shell. An electrophoresis chamber with the electrophoretic material hermetically sealing therein is mounted in a substrate. Also, a display section, a data communication section, a driver section, and a power reception section are mounted on the substrate. The data communication section is communicable with an external device to receive data to be displayed in the display section. The driver section is provided for driving the display section. To supply power to various sections of the display device, the power reception section is provided for wirelessly being supplied with power from an external station. A panel is mated with the substrate to cover the data communication section, the driver section, and the power reception section while exposing a transparent cover plate of the display section.

19 Claims, 6 Drawing Sheets

ELECTROPHORETIC DISPLAY DEVICE AND METHOD OF MANUFACTURING SAME

BACKGROUND OF THE INVENTION

1. Field of the Invention

The present invention relates to an electrophoretic display device and a method of manufacturing such an electrophoretic display device. More particularly, the invention relates to such a device having low power consumption and a method of manufacturing the same.

2. Description of the Related Art

Recently display devices using electrophoresis have been proposed. One such electrophoretic display device disclosed in Japanese Patent Application Publication No. 2003-216111 includes a viewing surface and an undersurface, with upper electrodes provided on the viewing surface and lower electrodes on the undersurface. Microcapsules are provided between the viewing surface and undersurface as image displaying means. Colored particles of different colors are dispersed in the microcapsules, the particles being charged with a positive or negative polarity depending on their color. When a voltage is applied across the upper and lower electrodes, an electric field is generated therebetween, causing the charged particles to migrate in the microcapsule. The migration of these colored particles is used for displaying images on the viewing surface.

The display device disclosed in Japanese Patent Application Publication No. 2003-216111 uses microcapsules having shells that encapsulate the particles. These shells are relatively thick (4 µm) with respect to the outer diameter (30 to 100 µm) of the microcapsules. As a result, the contrast of an image formed by two types of colored particles cannot be reproduced due to the thickness of the shell.

Further, a long distance between the upper and lower electrodes requires a high voltage for migrating the colored particles in the microcapsule. Hence, this type of display device tends to consume more power than the display devices with a reduced thickness.

SUMMARY OF THE INVENTION

In view of the foregoing, it is an object of the present invention to provide an electrophoretic display device having low power consumption and a method of manufacturing such a device.

To achieve the above and other objects, there is provided, according to one aspect of the invention, an electrophoretic display device including a substrate and a panel. The display device further includes a display section, a data communication section, a driver section, and a power reception section, all of which are mounted on one surface of the substrate. The display section includes a transparent cover plate, a sheet-like transparent electrode attached to the transparent cover plate, a frame connecting the substrate to the transparent cover plate, a plurality of electrodes each operable in conjunction with the sheet-like transparent electrode, and an electrophoretic material. The electrophoretic material includes an insulating solvent and electrically charged particles dispersed in the insulating solvent. An electrophoresis chamber is formed in the substrate and has a major inner space defined by the sheet-like transparent electrode, the frame, and the substrate. The insulating solvent and the particles are hermetically sealed within the electrophoresis chamber and the particles are migratable within the electrophoresis chamber. The cover plate has a display area that corresponds to an area in which the plurality of electrodes are arranged in confronting relation with the transparent electrode.

The data communication section is communicable with an external device to receive data to be displayed on the display area. The driver section is provided for driving the display section. The display section displays an image corresponding to the data received from the external device.

The display device may not be provided with a power source, such as a battery. To supply power to various sections of the display device, the power reception section is provided for wirelessly being supplied with power from an external station. The panel is mated with the substrate to cover the data communication section, the driver section, and the power reception section while exposing the transparent cover plate and the opposite surface of the substrate on which the various sections are mounted.

The electrophoretic display device thus constructed is easy to produce at a low cost and also the entire thickness can be made thinner than the conventional display devices because the panel is formed by coating the insulating material on the substrate.

According to another aspect of the invention, there is provided a method of manufacturing an electrophoretic display device. In this method, a first assembly is prepared and provided. The first assembly includes a substrate formed with an electrophoresis injection port and a plurality of electrodes. Then, a thermosetting material, such as an epoxy resin, is coated on a predetermined area of the substrate to form a frame. Next, a second assembly is prepared and provided. The second assembly includes a transparent cover plate, a sheet-like transparent electrode attached to the cover plate, and a spacer attached to the transparent electrode. The position of the spacer attached to the transparent electrode is offset from a display area formed in the cover plate. The display area corresponds to an area in which the plurality of electrodes are arranged in confronting relation with the transparent electrode.

Then, the second assembly is mounted on the predetermined position of the substrate. More specifically, the second assembly is placed on the predetermined position of the substrate and thereafter urging force is imparted on the second assembly to urge the second assembly against the substrate. At this time, the thermosetting material coated on the substrate is deformed attendant to urging the second assembly against the substrate.

Next, the thermosetting material coated on the predetermined area of the substrate is thermoset or hardened. Completely hardening the thermosetting material results in an electrophoresis chamber in the substrate that has a major inner space defined by the transparent electrode, the frame, and the substrate, wherein the electrophoresis injection port is in fluid communication with the inner space.

An electrophoretic material is injected through the electrophoresis injection port into the electrophoresis chamber. The electrophoretic material includes an insulating solvent and electrically charged particles dispersed in the insulating solvent. Then, the electrophoresis injection port is sealed so that the insulating solvent and the particles are hermetically sealed within the electrophoresis chamber. Because the insulating solvent and the particles are not confined in a shell as in the prior art, the particles can migrate within the electrophoresis chamber.

Finally, an insulating material is coated on the substrate on which the second assembly is mounted to form a panel. The insulating material is coated to expose the transparent cover plate.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

An electrophoretic display device according to a preferred embodiment of the present invention will be described while referring to the accompanying drawings.

Figure 1:
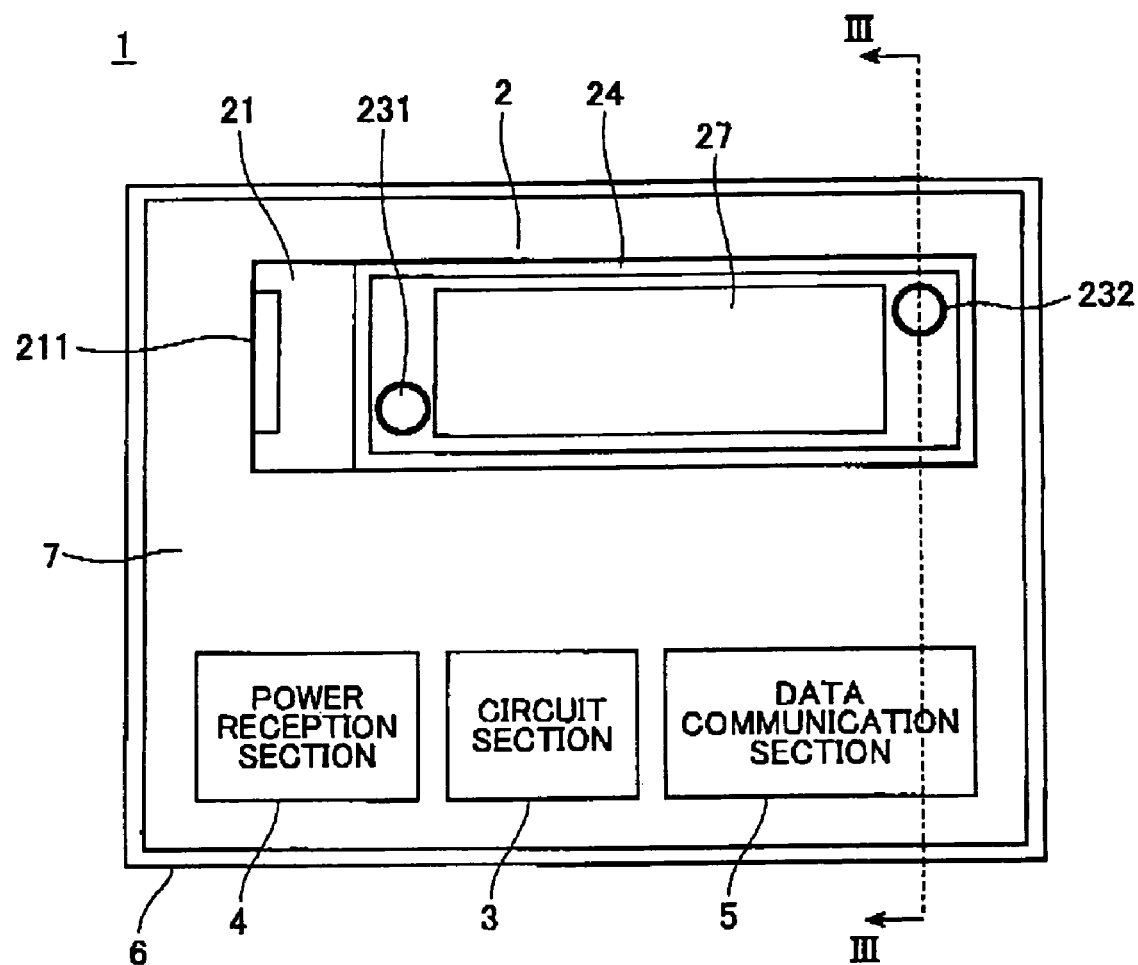
FIG. 1 is a schematic diagram showing a display device according to the preferred embodiment.

FIG. 1 is a schematic diagram of a display device 1 according to the preferred embodiment. The display device 1 includes a base substrate 23 (see in FIG. 3), a display section 2, a circuit section 3, a power reception section 4, a data communication section 5, an outer frame 6, and a panel 7. The display section 2, circuit section 3, power reception section 4, data communication section 5, and panel 7 are mounted on the base substrate 23.

The data communication section 5 is wirelessly connectable to an external device (not shown) and transmits data received from the external device to the circuit section 3.

The power reception section 4 is also wirelessly connectable to an external power source station (not shown) for receiving power from the external power source station. The power reception section 4 supplies the power received from the external power source station to the circuit section 3. Specifically, the power reception section 4 includes a coil that configures a transformer in cooperation with a coil of the external power source station. The power reception section 4 receives power from the external power source station by way of electromagnetic induction or electromagnetic wave. Incidentally, the external device may also serves as the external power source station.

The circuit section 3 is driven by power supplied from the power reception section 4 to display images on the display section 2 based on data received from the data communication section 5. The display section 2 displays images in white and black.

The outer frame 6 is formed of a thermosetting resin. As the thermosetting resin, an epoxy resin such as 353ND manufactured by Epoxy Technology, is preferable. The outer frame 6 determines the size of the overall display device 1, in greater detail, the thickness and the mold of the display device 1, on four sides. In the preferred embodiment, the outer frame 6, that is, the display device 1, is formed at the size of a credit card that is 85 mm wide×54 mm tall. The epoxy resin preferably has a high resistance to solvents; is a thermosetting resin and, hence, does riot soften under high temperatures; and has an insulating property. The outer frame 6 is formed to a height equivalent to the top of the cover glass plate 21 described later.

The panel 7 is also formed of an insulating epoxy resin such as 353ND and fills the interior of the frame 6 up to the top surface of the display section 2 (cover glass plate 21). Accordingly, the panel 7 covers the circuit section 3, power reception section 4, and data communication section 5 so that these components cannot actually be seen externally. A name, photo, or other desired data may be displayed on the surface of the panel 7 in print or on a seal.

Figure 2:
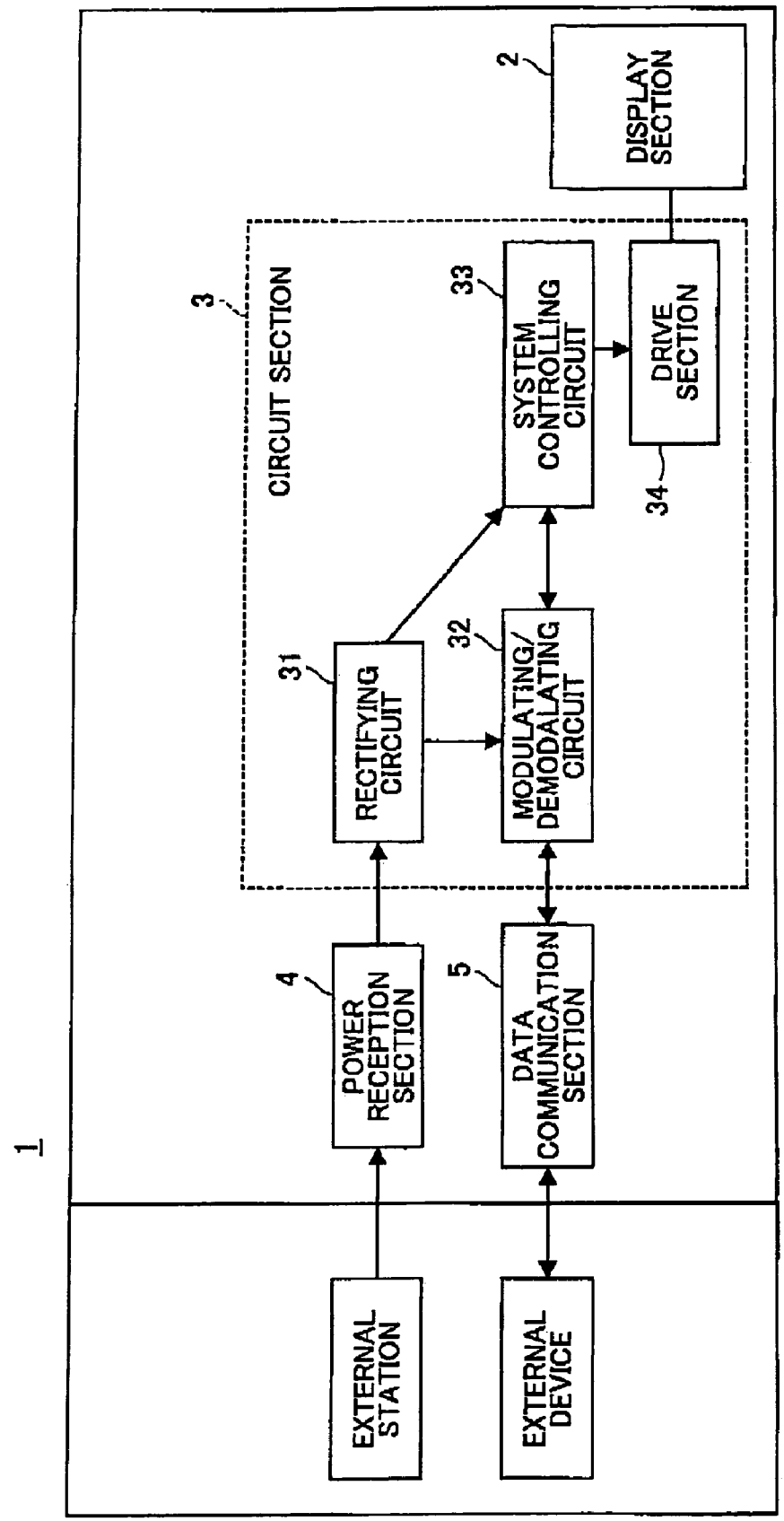
FIG. 2 is a block diagram showing the circuit configuration in the display device of the preferred embodiment.

Next, the structure of the circuit section 3 will be described with reference to FIG. 2. FIG. 2 is a block diagram showing the circuit configuration of the display device 1 according to the preferred embodiment. The circuit section 3 includes a rectifying circuit 31, a modulating/demodulating circuit 32, a system controlling circuit 33, and a driver section 34.

The rectifying circuit 31 rectifies the AC power inputted from the power reception section 4 to DC power and supplies this DC power to the modulating/demodulating circuit 32 and system controlling circuit 33. The modulating/demodulating circuit 32 modulates digital data received from the data communication section 5 to analog data and outputs the analog data to the system controlling circuit 33. The system controlling circuit 33 drives the driver section 34 based on data received from the modulating/demodulating circuit 32. The driver section 34 is driven by the system controlling circuit 33 to display images on the display section 2. While only one driver section 34 is shown in FIG. 2, in actuality thousands of driver sections 34 are provided in the circuit section 3.

Figure 3:
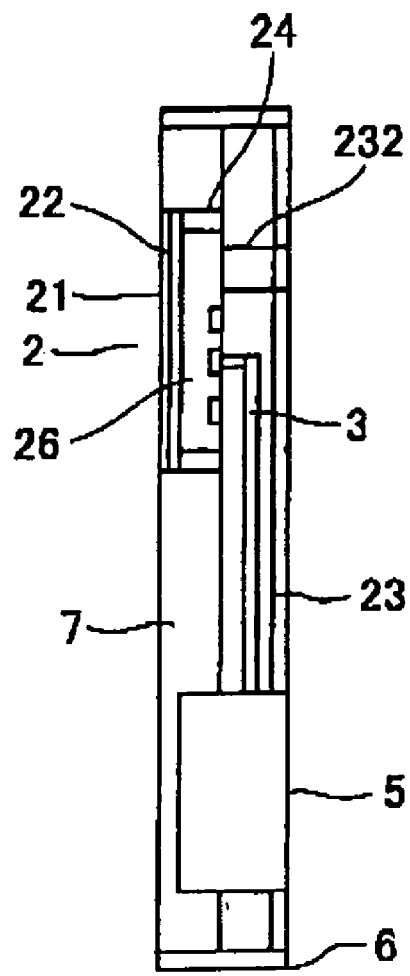
FIG. 3 is a cross-sectional view of the display device along the line III—III in FIG. 1.

Next, the structure of the display section 2 will be described with reference to FIGS. 1 and 3. FIG. 3 is a cross-sectional view of the display device 1 indicated by the line III—III in FIG. 1. The display section 2 includes the cover glass plate 21, a sheet-like, thin-film transparent electrode 22, a base substrate 23, an inner frame 24, spacers 25 (see FIGS. 4 and 7), and an image-forming section 26. The cover glass plate 21 serves as a viewing surface as well as a protecting cover.

The transparent electrode 22 is configured of an ITO (indium tin oxide) transparent electrode rectangular in shape and smaller than the cover glass plate 21. The cover glass plate 21 is formed of glass in a rectangular shape and is affixed to the transparent electrode 22 at the surface confronting the substrate 23. The thickness of the cover glass plate 21 plus the transparent electrode 22 is about 1 mm. Since the cover glass plate 21 and the transparent electrode 22 configured of ITO have excellent light transmittance, images formed on the image-forming section 26 described later can be transmitted to the viewer. However, since glass is breakable, a resin film such as a PET (polyethylene terephthalate) film may be used in place of glass. The transparent electrode 22 is connected to a terminal 211 disposed on the substrate 23 to be grounded.

The base substrate 23 has a terminal 211 that is connected to the transparent electrode 22 by electrically conductive epoxy resin. The terminal 211 is covered with the panel 7 so that the terminal 211 cannot be seen externally. Since the terminal 211 is reference potential (grounded), the transparent electrode 22 is reference potential (grounded). By providing the terminal 211 on the substrate 23, there is no danger that the terminal 211 contacts with an electrophoretic liquid 10 described later. The base substrate 23 is a TFT (thin film transistor) substrate. More specifically, thousands of transistors serving as the display section driving circuits 34 are provided in the base substrate 23. Accordingly, the base substrate 23 near the circuit section 3 is configured of a TFT substrate that can handle complex wiring, while the transparent electrode 22 far from the circuit section 3, thereby facilitating wiring of the display device 1. The thickness of the substrate 23 is about 1 mm. The driver sections 34 of the circuit section 3 are disposed in regions 51 opposing the transparent electrode 22. The region occupied by the driver sections 34 is smaller than the region occupied by the transparent electrode 22. A plurality of driver sections 34 exists, their number equivalent to the number of pixels in the display device 1. Accordingly, the region occupied by the driver sections 34 is a display area 27. As will be described later, the base substrate 23 also includes an electrophoresis injection port 231 and an air discharge port 232 that penetrate the base substrate 23.

The inner frame 24 is formed of a thermosetting resin having an electrically insulating property, such as B9073 manufactured by Epoxy Technology. The inner frame 24 is formed of four sides positioned along the periphery of the display section 2 outside a display area (pixel area) 27. The inner frame 24 has a rectangular cross-section when cut with a plane in parallel with the cover glass plate 21. As will be described later, the inner frame 24 functions both to bond the cover glass plate 21 to the base substrate 23 and to form a hermetic seal for the electrophoretic liquid 10.

Figure 4:
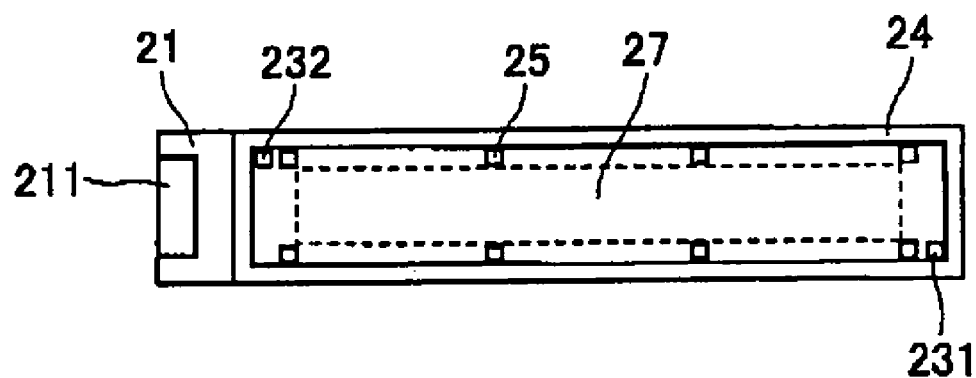
FIG. 4 is a schematic diagram showing an arrangement of spacers in the display device of the preferred embodiment.

The spacers 25 determine the gap between the cover glass plate 21 and the base substrate 23. As shown in FIG. 4, the spacers 25 are disposed at positions inside the frame 24 and around the periphery of the display area 27, and on the transparent electrode 22. The spacers 25 are prevented from contacting the inner frame 24. The reason for this will be described later. In the preferred embodiment, glass is employed in the spacers 25 due to its high resistance to solvents. However, another hard material may be used, provided that the material does not deform by pressure between the cover glass plate 21 and base substrate 23.

The image-forming section 26 is a space enclosed by the cover glass plate 21, base substrate 23, and inner frame 24. Here, the injection port 231 mentioned above is positioned outside the display area 27 and is in fluid communication with the image-forming section 26 near one corner of a rectangular area in the base substrate 23 that is surrounded by the inner frame 24. The discharge port 232 is also positioned outside the display area 27 and is in fluid communication with the image-forming section 26 near another corner of the rectangular area diagonal to the first corner. Areas in which the injection port 231 and discharge port 232 are in fluid communication with the image-forming section 26 are both inside the inner frame 24 and outside the display area 27.

The injection port 231 is an opening for injecting the electrophoretic liquid 10 into the image-forming section 26. The discharge port 232 is an opening for releasing air from the image-forming section 26. Since the injection port 231 and discharge port 232 are disposed near corners of the base substrate 23 in this way, that is, are not provided in the display area 27, the display area 27 will not be affected if air remains in the image-forming section 26. Further, being provided in the base substrate 23, the injection port 231 and discharge port 232 do not detract from the aesthetic quality of the cover glass plate 21. Since the display section 2, circuit section 3, and the like are mounted on the substrate 23, that is, integrally provided in the display device 1, of the preferred embodiment, it is difficult to inject electrophoretic liquid into the display section 2 by immersing the display section 2 in the liquid. However, the injection port 231 and discharge port 232 provided in the display device 1 of the preferred embodiment facilitate the injection of the electrophoretic liquid 10. In the display device 1 of the preferred embodiment, the section including the cover glass plate 21, transparent electrode 22, inner frame 24, the display section driving circuits 34, and electrophoretic liquid 10 is called the display section. The thickness of the display section is about 20 μm.

The electrophoretic liquid 10 is configured of an insulating solvent and colorant. A paraffinic solvent or silicon solvent is used as the insulating solvent since they have a relatively low viscosity and a low irritation to humans (high degree of safety). In the preferred embodiment, ISOPAR manufactured by Exxon Mobil Corporation is used as the insulating solvent.

The coloring in the electrophoretic liquid 10 is colored particles configured of pigments, dyes, or a synthetic resin with pigments or dyes. The preferred embodiment uses black particles with an average particle size of 3 μm formed from acrylic resin containing 40 wt % carbon black, and white particles having an average particle size of 3 μm formed from acrylic resin containing 40 wt % titanium dioxide. The black particles are positively charged, while the white particles are negatively charged. The color of the particles positively charged may be not black and the color of the particles negatively-charged may be not white as long as the color of the particles positively charged and the color of the particles negatively charged differ.

Next, the principles in which images are displayed on the cover glass plate 21 will be described. When a voltage is applied to the base substrate 23, an electric field is generated between the base substrate 23 and cover glass plate 21. Since the cover glass plate 21 is grounded, application of a positive voltage to the base substrate 23 will cause the positively charged black particles to migrate toward the cover glass plate 21 and the negatively charged white particles to migrate toward the base substrate 23. On the other hand, when a negative voltage is applied to the base substrate 23, the black particles migrate toward the base substrate 23 and the white particles toward the cover glass plate 21. This migration of black and white particles for each pixel can produce images on the cover glass plate 21.

Figure 5:
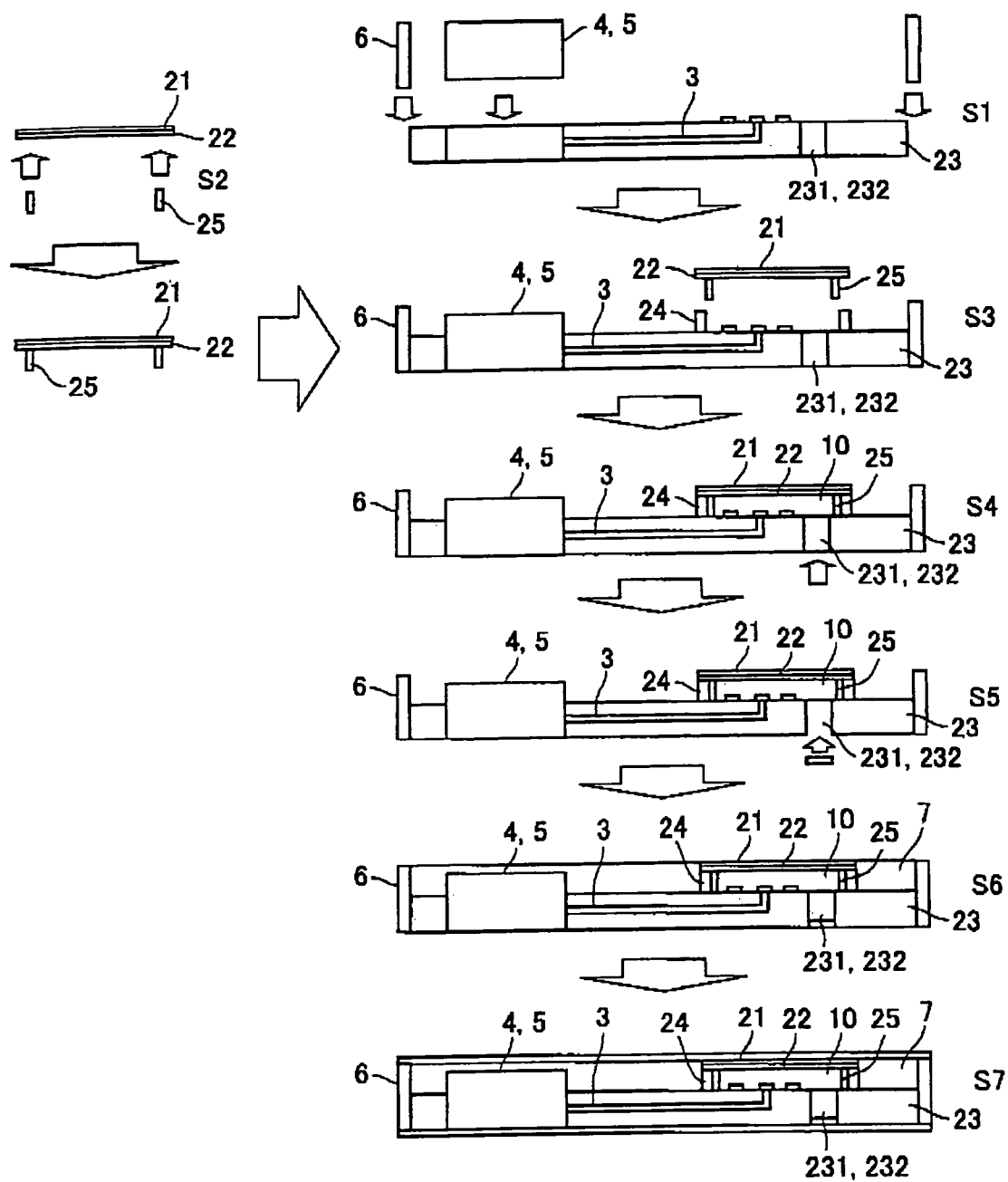
FIG. 5 is an explanatory diagram illustrating steps in a method of manufacturing a display device according to the preferred embodiment.

Next, a method for manufacturing the display section 2 having the above construction will be described. FIG. 5 is an explanatory diagram illustrating steps in the method for manufacturing the display device 2.

First, in S1 a first assembly is produced by bonding the outer frame 6, power reception section 4, and data communication section 5 to the base substrate 23. The base substrate 23 has been formed with the injection port 231 and the discharge port 232 and the circuit section 3 has been preformed in the base substrate 23.

In the meantime, separate from the construction of the first assembly produced in S1, a second assembly including the cover glass plate 21, transparent electrode 22 and the spacers 25 is bonded to the cover glass plate 21 of the first assembly in S2. Here, the transparent electrode 22 has already been laminated on the cover glass plate 21. The spacers 25 are attached to predetermined positions of the transparent electrode 22 where is offset from an area corresponding to the display area.

The laminated piece of the cover glass plate 21 and the transparent electrode 22 is produced by firstly forming or laminating the transparent electrode 22 on a large size glass plate and then cutting the electrode-formed glass plate into pieces of a prescribed size. Therefore, in this embodiment, the transparent electrode 22 and the cover glass plate 21 are the same size. The spacers 25 are later attached to the predetermined positions of each piece as shown in S2 of FIG. 5.

Figure 9A:
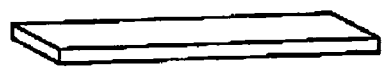
FIG. 9A–9G is a schematic diagram illustrating a method of attaching spacers to the transparent cover plate.
Figure 9B:
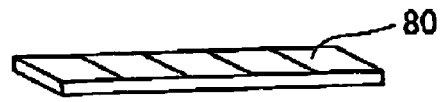
Figure 9C:
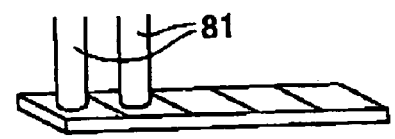
Figure 9D:
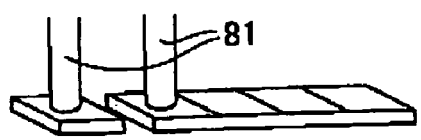
Figure 9E:
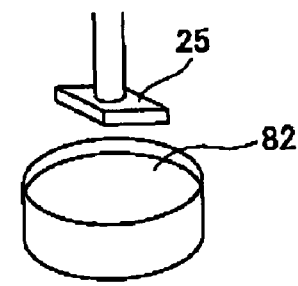
Figure 9F:
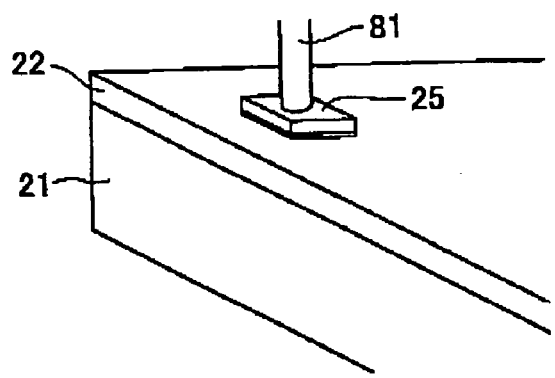
Figure 9G:
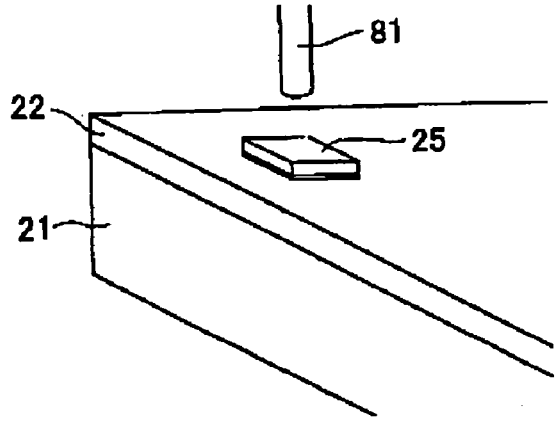

FIGS. 9A through 9G illustrates steps in the method for producing the spacers 25 and attaching the spacers 25 to the laminated piece produced as described above. In this embodiment, the spacers 25 are produced from an elongated glass plate with a thickness of 20 μm, a width of 500 μm, and a length of 250 μm as shown in FIG. 9A. As shown in FIG. 9B, cutting lines are drew on the surface of the glass plate at a constant interval of 1 mm in the widthwise direction using a pen-type tool 80 having a diamond at its tip end. Then, as shown in FIGS. 9C and 9D, the endmost glass piece is separated from the remainder using two vacuum-attracting pincettes 81. As shown in FIG. 9E, the separated glass piece, that is, the spacer 25, is pressed against an adhesive absorbing sponge 82. Then, as shown in FIG. 9F, the spacer 25 with the adhesive coated on one surface is placed on a predetermined position on the transparent electrode 22 and pressed thereagainst. Finally, as shown in FIG. 9G, the pincette 81 is removed from the spacer 25.

Referring back to FIG. 5, in S3 an epoxy resin for forming the inner frame 24 is applied to the base substrate 23 of the first assembly, and the second assembly produced in S2 is bonded to the base substrate 23. Here, a dispenser is used to apply a uniform amount of epoxy resin on the base substrate 23 in the form of a frame. The dispenser used in this embodiment has a nozzle with 0.1 mm diameter and the epoxy resin is applied from the nozzle to the base substrate 23 on a position 1 mm outside from the position where the spacers 25 are to be attached. When the volume of the epoxy resin in forming the inner frame 24 is increased, the dispenser needs to be placed apart further from the position where the spacers are to be attached. After forming the inner frame 24 with the epoxy resin on the base substrate 23, pressure is applied by the transparent electrode 22 and base substrate 23, pushing the epoxy resin down until it reaches a height equivalent to the height of the spacers 25, thereby forming the inner frame 24. The circuit section 3, power reception section 4, and data communication section 5 are set to have a height less than that of the cover glass plate 21 after the epoxy resin is compressed so that the circuit section 3, power reception section 4, and data communication section 5 are not exposed when later covered with epoxy resin to the top of the cover glass plate 21. The height of the outer frame 6 is also set equal to that of the cover glass plate 21 and serves as edges of a mold when epoxy resin is applied over the entire surface, of the base substrate 23, as will be described later.

Figure 6:
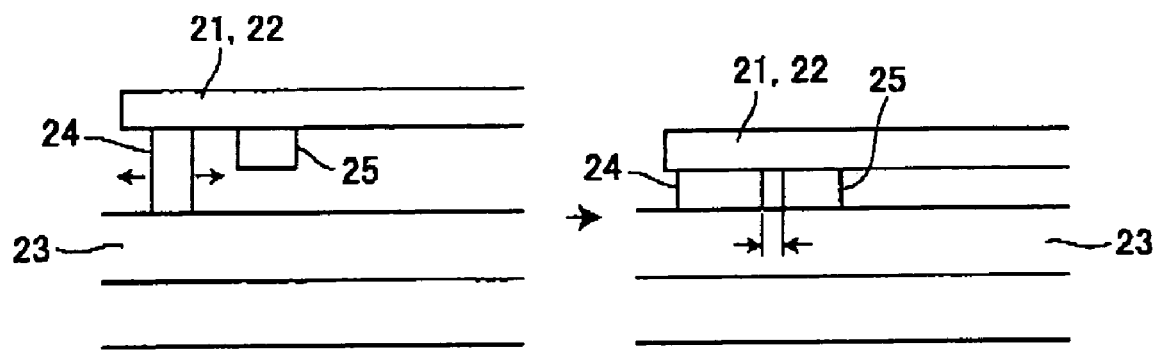
FIG. 6 is an explanatory diagram illustrating a method of forming the frame according to the preferred embodiment.

Here, it is necessary to ensure that the inner frame 24 does not contact the spacers 25, as shown in FIG. 6. Specifically, a gap of 0.2–1.0 mm must be formed between the inner frame 24 and spacers 25. Since liquid has a tendency to flow into gaps, if the inner frame 24 contacts the spacers 25, the inner frame 24, that is, the unhardened liquid epoxy resin, may seep between the spacers 25 and the base substrate 23 or between the spacers 25 and the cover glass plate 21, which can change the width of the image-forming section 26 from its desired value. If the width of the image-forming section 26 is greater than the prescribed value, the black particles in the electrophoretic liquid 10 must migrate a longer distance to form images, thereby requiring more energy than necessary. Hence, by ensuring that the inner frame 24 does not contact the spacers 25, it is possible to achieve low power consumption. Further, the horizontal dimension of the inner frame 24 after formation should be thicker than that of the spacers 25 in order to ensure adhesion between the inner frame 24 and the base substrate 23. The epoxy resin is then hardened by heat of about 40 degrees.

When the second assembly is thus mounted on the first assembly, the image-forming section (electrophoresis chamber) 26 is formed on the base substrate 23. The image-forming section 26 has a major inner space defined by the transparent electrode 22, the inner frame 24, and the base substrate 23 wherein the injection port 231 and the discharge port 232 are in fluid communication with the inner space and the plurality of electrodes formed on the base substrate 23 confront the transparent electrode 22.

Figure 7:
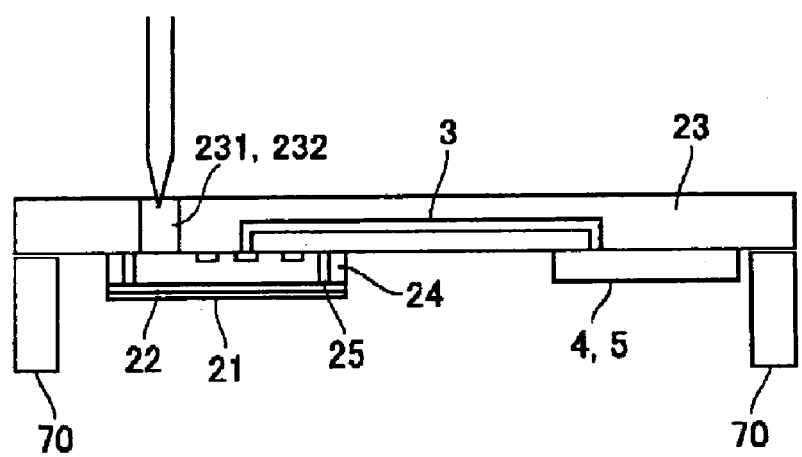
FIG. 7 is a schematic diagram illustrating a method of injecting an electrophoretic liquid through an injection port according to the preferred embodiment.

In S4 the electrophoretic liquid 10 is injected through the injection port 231 into the image-forming section 26 while air simultaneously escapes through the discharge port 232. The electrophoretic liquid 10 is injected until the image-forming section 26 is full. As shown in FIG. 7, the electrophoretic liquid 10 is injected into the injection port 231 while the upper surface of the base substrate 23 is placed on a support base 70 so that the injection port 231 is facing up In S5 the injection port 231 and discharge port 232 are hermetically sealed with epoxy resin in the preferred embodiment. However, a thermosetting, thermal expansive, or UV cure adhesive may be used in place of the epoxy resin.

In S6 epoxy resin is applied across the entire top surface of the base substrate 23 until the resin reaches a height equal to the top surface of the cover glass plate 21, that is, equal to the height of the outer frame 6. The epoxy resin is not applied to the top surface of the transparent electrode 22 to expose the latter. The thus applied epoxy resin, when hardened, serves as a panel of the display device 2. As described, the epoxy resin is coated up to a level in flush with the cover glass plate 21. The type of epoxy resin used in this case is restricted to an insulating resin. The epoxy resin prevents the circuit section 3 and the like from being exposed.

Finally, in S7 the outer sides of the cover glass plate 21 and base substrate 23 are coated with an epoxy resin. At this time, the entire assembly excluding the cover glass plate 21 may be coated. Alternatively, a seal may be applied instead of the coating.

With this construction, the display device 1 of the preferred embodiment does not employ microcapsules and, therefore, can display vivid images on a credit card-size display device through a simple construction. For example, the display on a prepaid card or the like can be easily and clearly rewritten. Further, provision of the injection port 231 and discharge port 232 facilitates injection of the electrophoretic liquid 10.

While the display device 1 of the present invention has been described in detail with reference to specific embodiments thereof, it would be apparent to those skilled in the art that many modifications and variations may be made therein without departing from the spirit of the invention, the scope of which is defined by the attached claims. For example, the display device 1 is formed in the size and shape of a credit card in the preferred embodiment described above, but is not limited to this size. The display device 1 may be formed 210 mm wide×297 mm tall, which is the size of an A4 sheet of paper, or 841 mm wide×1,189 mm tall, which is an A0 poster size.

Figure 8:
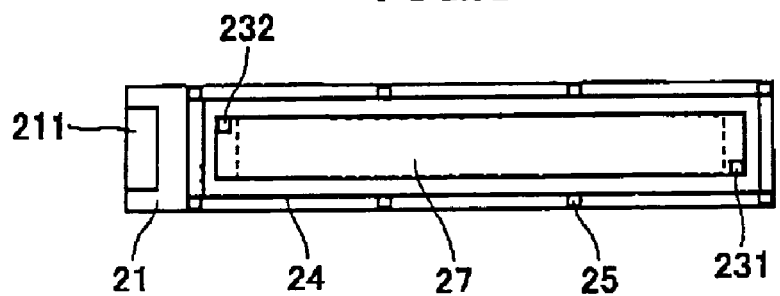
FIG. 8 is a schematic diagram showing another arrangement of spacers in the display device of the preferred embodiment.

Further, the spacers 25 may be disposed outside of the inner frame 24, as shown in FIG. 8. Also, while the injection port 231 and discharge port 232 are preferably disposed on the base substrate 23 so as not to detract from the aesthetic quality of the cover glass plate 21, the injection port 231 and discharge port 232 may be disposed on the cover glass plate 21.

Further, in the embodiment described above, an electric field is generated between the cover glass plate 21, which is grounded, and the base substrate 23, which is a TFT substrate. However, a matrix electrode may be configured of an upper substrate having a plurality of upper electrodes and a lower substrate having a plurality of lower electrodes orthogonal to the upper electrodes to generate an electric field between the two substrates. In this case, the points of intersection between the upper and lower electrodes when viewed from the upper substrate side or from the lower substrate side form individual pixels.

In the embodiment described above, an epoxy resin is used in forming the inner frame 24. However, other thermosetting materials having an adhesive property may be used as a material for forming the inner frame.

Further, rather than electromagnetic induction, the power reception section 4 may supply power from an external device in the form of electromagnetic waves or the like. Further, while the power reception section 4 and data communication section 5 are formed as separate units in the preferred embodiment, they may be integrally formed as a single unit instead.

What is claimed is:

1. An electrophoretic display device comprising:
    a substrate having a first surface and a second surface opposite the first surface;
    a display section mounted on the first surface of the substrate, the display section including a transparent cover plate having a display area, a sheet-like transparent electrode attached to the transparent cover plate, a frame connecting the substrate to the transparent cover plate, a plurality of electrodes each operable in conjunction with the sheet-like transparent electrode, and an electrophoretic material including an insulating solvent and electrically charged particles dispersed in the insulating solvent, wherein an electrophoresis chamber is formed in the first surface of the substrate and has a major inner space defined by the sheet-like transparent electrode, the frame, and the substrate, the insulating solvent and the particles being hermetically sealed within the electrophoresis chamber and the particles being migratable within the electrophoresis chamber, and wherein the display area corresponds to an area in which the plurality of electrodes are arranged in confronting relation with the sheet-like transparent electrode;
    a data communication section that is mounted on the substrate and communicable with an external device;
    a driver section that is mounted on the substrate and drives the display section to display an image corresponding to data received from an external device on the display area;
    a power reception section that is mounted on the substrate and is capable of being wirelessly supplied with power from an external station; and
    a panel mated with the substrate to cover the data communication section, the driver section, and the power reception section while exposing the transparent cover plate and the second surface of the substrate.

2. The electrophoretic display device according to claim 1, wherein the transparent cover plate is in flush with the panel.

3. The electrophoretic display device according to claim 2, wherein the transparent cover plate is made of glass.

4. The electrophoretic display device according to claim 1, wherein the transparent cover plate is larger in size than the sheet-like transparent electrode.

5. The electrophoretic display device according to claim 1, wherein the panel is made from a thermosetting material having an electrically insulating property.

6. The electrophoretic display device according to claim 5, wherein the panel is made from an epoxy resin.

7. The electrophoretic display device according to claim 1, wherein the display area is substantially same in size as the area in which the plurality of electrodes are arranged.

8. The electrophoretic display device according to claim 7, wherein the sheet-like transparent electrode is larger in size than the area in which the plurality of electrodes are arranged.

9. The electrophoretic display device according to claim 8, wherein the sheet-like transparent electrode is completely encompassed by the frame.

10. The electrophoretic display device according to claim 1, wherein the frame has a rectangular cross-section when cut with a plane in parallel with the transparent cover plate.

11. The electrophoretic display device according to claim 10, wherein the frame is made from an epoxy resin.

12. The electrophoretic display device according to claim 1, wherein the plurality of electrodes are arranged in row and column.

13. The electrophoretic display device according to claim 1, wherein the plurality of electrodes are arranged in matrix form.

14. The electrophoretic display device according to claim 1, wherein power is supplied to the power reception section by way of electromagnetic induction or electromagnetic wave.

15. The electrophoretic display device according to claim 1, wherein an electrophoresis injection port is formed in the substrate to be in fluid communication with the electrophoresis chamber.

16. The electrophoretic display device according to claim 15, wherein an air discharge port is formed in the substrate to be in fluid communication with the electrophoresis chamber.

17. The electrophoretic display device according to claim 16, wherein the electrophoresis injection port and the air discharge port are formed in the substrate in positions outside an area corresponding to the display area.

18. The electrophoretic display device according to claim 16, wherein the flame has a rectangular cross-section when cut with a plane in parallel with the transparent cover plate, and the electrophoresis injection port and the air discharge port are formed on a diagonal line of the rectangular shape.

19. The electrophoretic display device according to claim 1, wherein the data communication section, the driver section, and the power reception section is mounted on the first surface of the substrate.

* * * * *

UNITED STATES PATENT AND TRADEMARK OFFICE
CERTIFICATE OF CORRECTION

PATENT NO. : 7,106,485 B2  
APPLICATION NO. : 11/023403  
DATED : September 12, 2006  
INVENTOR(S) : Yasuhiro Hattori et al.

Page 1 of 1

It is certified that error appears in the above-identified patent and that said Letters Patent is hereby corrected as shown below:

On the title page, item [75] should read

-- Inventors: Yasuhiro Hattori, Nagoya (JP); Yoshito Toyoda, Nagoya (JP); Yoshiyuki Kondo, Okazaki (JP); Yuji Hori, Hashima (JP); Fumika Miyazaki, Nagoya (JP); Yumiko Mori, Nagoya (JP); Tsuyoshi Ohashi, Hashima (JP); J. Douglas Fletcher, Bartlett, TN (US); Mark A. Darty, Collierville, TN (US) --

Signed and Sealed this

Twenty-seventh Day of March, 2007

JON W. DUDAS  
*Director of the United States Patent and Trademark Office*